United States Patent
Tanaka et al.

(10) Patent No.: US 8,374,194 B2
(45) Date of Patent: Feb. 12, 2013

(54) COMMUNICATION DEVICE AND BANDWIDTH ALLOCATION METHOD

(75) Inventors: Masaki Tanaka, Tokyo (JP); Takashi Kikuzawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 221 days.

(21) Appl. No.: 12/741,119

(22) PCT Filed: Nov. 20, 2008

(86) PCT No.: PCT/JP2008/071129
§ 371 (c)(1),
(2), (4) Date: May 3, 2010

(87) PCT Pub. No.: WO2009/066733
PCT Pub. Date: May 28, 2009

(65) Prior Publication Data
US 2010/0254407 A1     Oct. 7, 2010

(30) Foreign Application Priority Data
Nov. 21, 2007    (JP) ................................ 2007-301634

(51) Int. Cl.
*H04L 12/43*    (2006.01)
(52) U.S. Cl. ..................................................... 370/458
(58) Field of Classification Search .......... 370/229–235, 370/351–429, 431–463
See application file for complete search history.

(56) References Cited

U.S. PATENT DOCUMENTS

| | | | |
|---|---|---|---|
| 7,443,861 B2 * | 10/2008 | Lee et al. ................. | 370/395.42 |
| 7,573,897 B2 * | 8/2009 | Elmoalem et al. ............ | 370/458 |
| 7,680,414 B2 * | 3/2010 | Kazawa et al. ................. | 398/67 |
| 2002/0196801 A1 * | 12/2002 | Haran et al. ................... | 370/432 |
| 2004/0252714 A1 * | 12/2004 | Oh et al. ....................... | 370/437 |
| 2005/0041682 A1 | 2/2005 | Kramer | |
| 2005/0158048 A1 * | 7/2005 | Sung et al. ...................... | 398/66 |
| 2006/0159040 A1 * | 7/2006 | Takemoto et al. ............ | 370/321 |

(Continued)

FOREIGN PATENT DOCUMENTS

| | | |
|---|---|---|
| EP | 1 292 054 A2 | 3/2003 |
| EP | 1 292 054 A3 | 3/2003 |

(Continued)

OTHER PUBLICATIONS

Office Action issued Jun. 21, 2011 in Japanese Patent Application No. 2009-542586 (with English translation).

(Continued)

*Primary Examiner* — Andrew Lai
*Assistant Examiner* — Juvena Loo
(74) *Attorney, Agent, or Firm* — Oblon, Spivak, McClelland, Maier & Neustadt, L.L.P.

(57) ABSTRACT

A communication device, which provides a bandwidth allocation opportunity to ONUs each having different data transmission rates, not depending on any specific bandwidth-request notifying method, thereby realizing fair upstream transmission data delay between data transmission rates of respective ONUs, includes a bandwidth-update-cycle division processor that divides the bandwidth update cycle into slots of each of the data transmission rates, a bandwidth-allocation-amount calculating unit that allocates a bandwidth to the slave station devices in a slot of the data transmission rate, and a transmission-start-time calculating unit that sets a transmission start time and a transmission time of data of the slave station devices, based on an overhead length of a data frame transmitted by the slave station devices.

11 Claims, 7 Drawing Sheets

U.S. PATENT DOCUMENTS

| | | | |
|---|---|---|---|
| 2006/0176806 A1 | 8/2006 | Yoshihara et al. | |
| 2007/0041384 A1* | 2/2007 | Das et al. | 370/395.4 |
| 2007/0248109 A1* | 10/2007 | DeCarolis et al. | 370/412 |
| 2010/0027561 A1* | 2/2010 | Greborio et al. | 370/468 |

FOREIGN PATENT DOCUMENTS

| | | |
|---|---|---|
| JP | 2002 344469 | 11/2002 |
| JP | 2003 87282 | 3/2003 |
| JP | 2003 87283 | 3/2003 |
| JP | 2004 336578 | 11/2004 |
| JP | 2005 33537 | 2/2005 |
| JP | 2005 124059 | 5/2005 |
| JP | 2006 5387 | 1/2006 |
| JP | 2006 237769 | 9/2006 |
| JP | 2007-243284 | 9/2007 |
| JP | 2007 274280 | 10/2007 |
| KR | 2003-0073482 | 9/2003 |
| WO | 2005 027428 | 3/2005 |
| WO | 2005 062543 | 7/2005 |

OTHER PUBLICATIONS

"IEEE Standards 802.3ahTM-2004", IEEE Standard for Information technology—Telecommunications and information exchange between systems—Local and metropolitan area networks—Specific requirements, IEEE Computer Society, pp. 421-476, Sep. 2, 2004.

Kramer, Glen et al., "10G EPON-1G EPON Coexistence" IEEE802.3av 10G EPON Task Force, Presentation Materials, p. 1-12, Jan. 15, 2007.

Yoshihara, Osamu et al., "Dynamic Bandwidth Allocation Algorithm for GE-PON", Technical Report of IEICE, NS2002-17, The Institute of Electronics, Information and Communication Engineers, Section 4.2-4.3, (2002), (with partial English translation).

Korean Office Action issued Jun. 7, 2011, in Patent Application No. 10-2010-7013229.

Extended European Search Report, issued Dec. 12, 2012 in Application No. EP 08852084.6.

* cited by examiner

COMMUNICATION DEVICE AND BANDWIDTH ALLOCATION METHOD

TECHNICAL FIELD

The present invention relates to a communication device and a bandwidth allocation method used in a communication system in which a master station device and a plurality of slave station devices are connected in a one-to-many relationship.

BACKGROUND ART

As one of an access network that connects homes or companies to a higher-order network, there has been used a PON (passive optical network) system for connecting a master station device (hereinafter, OLT (optical line terminal)) and many slave station devices (hereinafter, ONUs (optical network units)) in a one-to-many relationship by an optical fiber and a splitter. In such a PON system with a one-to-many relationship, when upstream data communication from each of the ONUs to an OLT is performed, each ONU transmits a bandwidth request signal indicating a bandwidth request amount for its own device to the OLT, the OLT allocates a bandwidth to each of the ONUs based on the bandwidth request amount of each of the ONUs, and transmits a transmission permission signal indicating a transmission start time and a transmission time to each of the ONUs. Thereafter, each of the ONUs receives the transmission permission signal transmitted from the OLT for its own device, and performs a bandwidth allocating process for transmitting upstream data according to the content of the transmission permission signal.

As such a PON system, there has been known a system mode having a data transmission rate of 1 Gbit/s respectively for upstream communication and downstream communication, in which bi-directional communication by wavelength multiplexing using different wavelengths for upstream communication and downstream communication is performed, and when a plurality of ONUs transmit upstream data, the data is transmitted according to a time-division multiplexing system in which an upstream bandwidth is divided among the plurality of ONUs (see, for example, Nonpatent Literature 1).

Meanwhile, a PON system that realizes a high data transmission rate has been developed with performance improvements of optical devices. The PON system has a configuration capable of performing transmission at a high data transmission rate in the same PON system, while maintaining upward compatibility with an existing PON system having a low data transmission rate. As a developed model of such a PON system, there has been known another PON system in which an OLT has data transmission rates of 1 Gbit/s and 10 Gbit/s in both upstream and downstream directions, and as an ONU, a device having a data transmission rate of 1 Gbit/s in both upstream and downstream directions, a device having a data transmission rate of 10 Gbit/s in both upstream and downstream directions, and a device having a data transmission rate of 1 Gbit/s in the upstream direction and 10 Gbit/s for the downstream direction are present in a mixed manner (see, for example, Nonpatent Literature 2). In such a PON system in which a plurality of ONUs having different data transmission rates are connected, data transmission is performed according to a wavelength multiplexing system in a downstream direction by dividing a wavelength for each of data transmission rates, and in an upstream direction, data transmission is performed according to a time-division multiplexing system in which one wavelength is used and the bandwidth is shared by a plurality of ONUs. Therefore, upstream bandwidth allocation needs to be performed also in a communication system including ONUs having a plurality of data transmission rates.

Further, as a method of allocating an upstream bandwidth to ONUs by an OLT, there has been known a technique in which each ONU informs the OLT of two values of large and small as a bandwidth request amount, the OLT allocates a small bandwidth request amount to the ONU in a low delay class in a short cycle, and allocates a large bandwidth request amount to the ONU in a normal class in a long cycle, thereby reducing a delay of upstream data from the ONUs and improving the bandwidth use efficiency (see, for example, Nonpatent Literature 3).

Nonpatent Literature 1: "IEEE Standards 802.3ahTM-2004", 7 Sep. 2004, IEEE (Institute of Electrical and Electronics Engineers) Computer Society Nonpatent Literature 2: Glen Kramer et al., "10GEPON-1GEPON Coexistence", Jan. 15, 2007, IEEE802.3av 10GEPON Task Force, Presentation Materials Nonpatent Literature 3: Osamu Yoshihara et al., "Dynamic Bandwidth Allocation Algorithm for GE-PON", Technical Report of IEICE, NS2002-17, the Electronics, Information and Communication Engineers

DISCLOSURE OF INVENTION

Problem to be Solved by the Invention

In a PON system including a plurality of ONUs having different data transmission rates, such a service mode can be exemplified that an ONU having a high data transmission rate can have low delay in upstream data transmission as compared with an ONU having a low data transmission rate. However, in Nonpatent Literature 3, there is a problem that low delay can be realized only when the ONU includes a specific bandwidth-request-amount notifying method. Further, if the ONU having a high data transmission rate is given absolute priority, data delay of the ONU having a low data transmission rate increases.

The present invention has been achieved in view of the above problems, and an object of the invention is to achieve a communication device and a bandwidth allocation method that can realize fair upstream transmission data delay between data transmission rates of respective ONUs, by providing a bandwidth allocation opportunity to ONUs having respective data transmission rates, not depending on any specific bandwidth-request-amount notifying method with respect to ONUs having a high data transmission rate and ONUs having a low data transmission rate.

Means for Solving Problem

In order to solve the aforementioned problems, a communication device according to the present invention, which is connected to a plurality of slave station devices having different data transmission rates, which generates a transmission permission signal including a transmission start time and a transmission time of data with respect to each of the plurality of slave station devices in a bandwidth update cycle based on a bandwidth request amount from each of the slave station devices and notifies the slave station devices of the transmission permission signal, is constructed in such a manner as to include: a bandwidth-update-cycle dividing unit that divides the bandwidth update cycle into slots for each of the data transmission rates based on the bandwidth request amount from each of the slave station devices and a communication quality set for each of the slave station devices; a bandwidthallocation-amount calculating unit that allocates a bandwidth to each of the slave station devices in a slot of the corresponding data transmission rate; and a transmission-start-time setting unit that sets a transmission start time and a transmission time of data of each of the slave station devices, based on an overhead length of a data frame transmitted by each of the slave station devices.

Effect of the Invention

According to the present invention, the bandwidth use efficiency can be improved by using a burst overhead corresponding to the data transmission rate. Even if the slave station device is not equipped with any specific bandwidth-request-amount notifying method, fair transmission data delay can be realized by providing a bandwidth allocation opportunity according to the data transmission rate.

EXPLANATIONS OF LETTERS OR NUMERALS

10 Master station device (OLT)
11, 21 E/O converter
12 Bandwidth-request extracting unit
13 Bandwidth-update-cycle division processor
14 Bandwidth-allocation-amount calculating unit
15 Transmission-start-time calculating unit
16 Transmission-permission-signal transmitting unit
20-1 to 20-$n$ Slave station device (ONU)
22 Data buffer
23 Bandwidth-request calculating unit
24 Reception processor
25 Data transmission controller
30 Splitter
40 Optical fiber

BEST MODE(S) FOR CARRYING OUT THE INVENTION

Preferable exemplary embodiments of a communication device and a bandwidth allocation method according to the present invention will be explained below in detail with reference to the accompanying drawings. The present invention is not limited to the embodiments.

Figure 1:
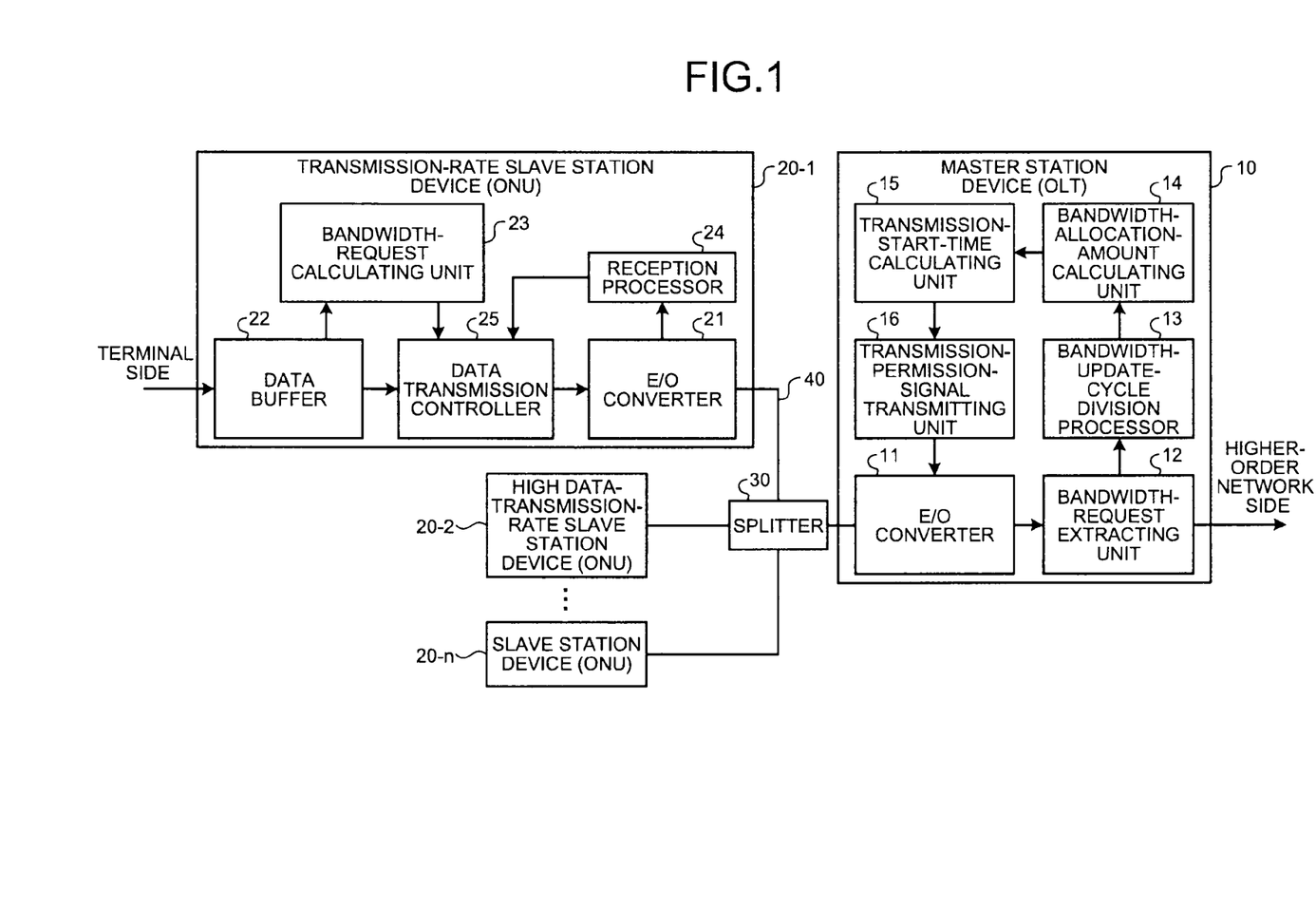
FIG. 1 is a schematic block diagram of a configuration of an embodiment of a PON system including a communication device according to the present invention.

FIG. 1 is a schematic block diagram of a configuration of an embodiment of a PON system including a communication device according to the present invention. In the PON system, a master station device (hereinafter, OLT) 10 and a plurality of slave station devices (hereinafter, ONU) 20-1, 20-2, ..., 20-$n$ are connected in a one-to-many relationship via an optical fiber 40 including a splitter 30. The OLT 10 is further connected to a higher-order network, and each of the ONUs 20-1 to 20-$n$ is connected to a terminal device held by respective homes and companies. The ONUs 20-1 to 20-$n$ are constituted by plural types of devices having different data transmission rates. It is assumed that the ONUs 20-1 to 20-$n$ include two types of ONUs, that is, ONUs having a low data transmission rate (hereinafter, "low-rate ONU") and ONUs having a high data transmission rate (hereinafter, "high-rate ONU"). In an example in FIG. 1, it is assumed that the ONU 20-1 is a low-rate ONU, the ONU 20-2 is a high-rate ONU, ..., and the ONU 20-$n$ is an ONU having either one of the data transmission rates. In the present embodiment, a case in which the ONUs 20-1 to 20-$n$ are classified to either one of the two data transmission rates, that is, high data transmission rate and low data transmission rate is explained. However, the classification of the data transmission rate is not limited thereto, and the present invention can be applied to a case in which the ONUs 20-1 to 20-$n$ having three or more types of data transmission rates are connected.

The OLT 10 includes an E/O converter 11 that performs electro-optical conversion corresponding to the high/low data transmission rate, a bandwidth-request extracting unit 12 that extracts a bandwidth request signal from upstream data transmitted by the ONUs 20-1 to 20-$n$, a bandwidth-update-cycle division processor 13 that divides a bandwidth update cycle for each type of transmission rates based on a bandwidth request amount of the respective ONUs 20-1 to 20-$n$ extracted by the bandwidth-request extracting unit 12, a bandwidth-allocation-amount calculating unit 14 that calculates a bandwidth allocation amount to the respective ONUs 20-1 to 20-$n$ based on the divided bandwidths and the bandwidth request amount of the respective ONUs 20-1 to 20-$n$, a transmission-start-time calculating unit 15 that calculates a transmission start time and a required transmission time based on the allocated bandwidth and a burst overhead of the respective ONUs 20-1 to 20-$n$, and a transmission-permission-signal transmitting unit 16 that generates a transmission permission signal for informing the transmission start time and the transmission time allocated to each of the ONUs 20-1 to 20-$n$ and transmits the transmission permission signal to the respective ONUs 20-1 to 20-$n$.

The bandwidth-update-cycle division processor 13 weights the bandwidth request amount of the respective ONUs 20-1 to 20-$n$ by a numerical value indicating a communication quality to obtain the sum thereof for each rate, and obtains a percentage of the respective rates with respect to the sum total thereof to divide the bandwidth update cycle into slots for each rate. Here, a case in which a minimum bandwidth set to the respective ONUs 20-1 to 20-$n$ is used as the numerical value indicating the communication quality is explained here. That is, the bandwidth-update-cycle division processor 13 obtains the sum total of numbers obtained by multiplying the minimum bandwidths by the bandwidth request amount of the respective low-rate ONUs and the sum total of numbers obtained by multiplying the minimum bandwidth by the bandwidth request amount of the respective high-rate ONUs, and uses a percentage of the sum total of the ONUs of the respective rates with respect to these sum totals, so as to divide the bandwidth update cycle into a high data-transmission-rate slot (hereinafter, "high-rate slot") and a low data-transmission-rate slot (hereinafter, "low-rate slot"). Thus, by weighting the bandwidth request amount of the respective ONUs 20-1 to 20-$n$ by the minimum bandwidth amount, data delay can be set corresponding to the minimum bandwidth of the ONUs 20-1 to 20-$n$ of the respective rates.

The bandwidth-allocation-amount calculating unit 14 allocates a bandwidth of a high-rate slot to each of the high-rate ONUs and allocates a bandwidth of a low-rate slot to each of the low-rate ONUs based on the bandwidth request amount from the ONUs 20-1 to 20-n.

The bandwidth-update-cycle division processor 13 and the bandwidth-allocation-amount calculating unit 14 can realize low delay substantially proportional to the size of the minimum bandwidth with respect to all the ONUs 20-1 to 20-n by using the minimum bandwidth set to the respective ONUs 20-1 to 20-n to allocate the bandwidth request amount requested from the respective ONUs 20-1 to 20-n, without using any specific bandwidth-request-amount notifying method.

The transmission-start-time calculating unit 15 includes an overhead-length holding function for holding overhead information including a front overhead length and a rear overhead length of a burst frame for each of the ONUs 20-1 to 20-n to be connected. The transmission-start-time calculating unit 15 further includes a transmission-start-time calculating function for calculating the transmission time by searching for the first overhead having the first overhead length closest to the rear overhead length of the frame of the ONUs 20-1 to 20-n for which the transmission start time is set last time by the overhead-length holding function, and setting a transmission start time to overlap the first overhead of the ONUs 20-1 to 20-n with the rear overhead of the ONUs 20-1 to 20-n for which the transmission start time is set last time up to an allowable maximum range, so that an overlap sum of the first overhead and the rear overhead between the burst frames within the bandwidth update cycle becomes the largest.

In the PON system in which the ONUs 20-1 to 20-n having different data transmission rates are connected, the ONUs 20-1 to 20-n having the high data transmission rate have such a property that the overhead of a transmission burst frame decreases as compared with the ONUs 20-1 to 20-n having the low data transmission rate. In the transmission-start-time calculating function, therefore, the transmission start time is set so that the burst frames of the ONUs 20-1 to 20-n having the same or similar data transmission rate are continued. Accordingly, an overlap amount of the overheads of the respective burst frames can be maximized, and the bandwidth use efficiency can be improved.

The ONUs 20-1 to 20-n respectively include an E/O converter 21 that performs electro-optical conversion as an interface on the OLT 10 side, a data buffer 22 that accumulates data received from an interface on a terminal side, a bandwidth-request calculating unit 23 that calculates a bandwidth request to the OLT 10 based on the data amount accumulated in the data buffer 22, a reception processor 24 that receives data from the OLT 10 including the transmission permission signal with respect to the bandwidth request for the data transmitted last time, and a data transmission controller 25 that transmits the bandwidth request signal and the data accumulated in the data buffer 22 to the OLT 10 according to the transmission permission signal from the OLT 10. In the case of the low-rate ONUs 20-1, ..., the E/O converter 21 performs optical-electro conversion corresponding to the low data transmission rate, and in the case of high-rate ONUs 20-2, ..., the E/O converter 21 performs optical-electro conversion corresponding to the high data transmission rate.

A normal communication operation between the OLT 10 and the ONUs 20-1 to 20-n in the PON system is explained next, and then a bandwidth allocation method of the OLT 10 according to the present embodiment is explained.

The ONUs 20-1 to 20-n accumulate the data received from the terminal in the data buffer 22. The bandwidth-request calculating unit 23 then calculates the bandwidth request amount by referring to the content of the data buffer 22, and generates a bandwidth request signal to be transmitted to the OLT 10, to transmit the bandwidth request signal to the data transmission controller 25. The data transmission controller 25 transmits the bandwidth request signal together with the data stored in the data buffer 22 based on the content of the transmission permission signal from the OLT 10 received last time (a start time and a transmission time of upstream data transmission). The bandwidth request signal is converted from an electric signal to an optical signal by the E/O converter 21, and a data signal is transmitted to the OLT 10 via the optical fiber 40. In the middle of this transmission, the data including the bandwidth request signal from the respective ONUs 20-1 to 20-n are multiplexed by the splitter 30.

Upon reception of the bandwidth request signal from each of the ONUs 20-1 to 20-n, the OLT 10 converts the bandwidth request signal from the optical signal to the electric signal by the E/O converter 11. The bandwidth-request extracting unit 12 extracts the bandwidth request amount of the respective ONUs 20-1 to 20-n from the bandwidth request signal. The bandwidth-allocation-amount calculating unit 14 then allocates the bandwidth to the ONUs 20-1 to 20-n based on the bandwidth request amount, and the transmission-start-time calculating unit 15 calculates the data transmission start-time and the data transmission time for each of the ONUs 20-1 to 20-n. The transmission-permission-signal transmitting unit 16 generates a transmission permission signal storing the data transmission-start time and the data transmission time therein for each of the ONUs 20-1 to 20-n, and the E/O converter 11 converts each of the transmission permission signals from the electric signal to the optical signal to transmit the optical signal to the corresponding ONUs 20-1 to 20-n.

In the ONUs 20-1 to 20-n, the E/O converter 21 converts the received transmission permission signals each from the optical signal to the electric signal. The reception processor 24 receives only the transmission permission signal addressed to the own device among the converted transmission permission signals, and discards the transmission permission signal addressed to other devices, and transmits the data transmission-start time and the data transmission time of the own device to the data transmission controller 25. Simultaneously, the bandwidth-request calculating unit 23 accumulates the data received from the terminal in the data buffer 22, and calculates the bandwidth request amount by referring to the content of the data buffer 22, thereby generating a bandwidth request signal. The data transmission controller 25 extracts the data received from the terminal last time from the data buffer 22 at the data transmission time instructed in the transmission permission signal, together with the bandwidth request signal, and transmits the data to the OLT 10 within a time specified by the data transmission time. The above process is repeatedly executed, to perform communication between the OLT 10 and the ONUs 20-1 to 20-n.

Figure 2:
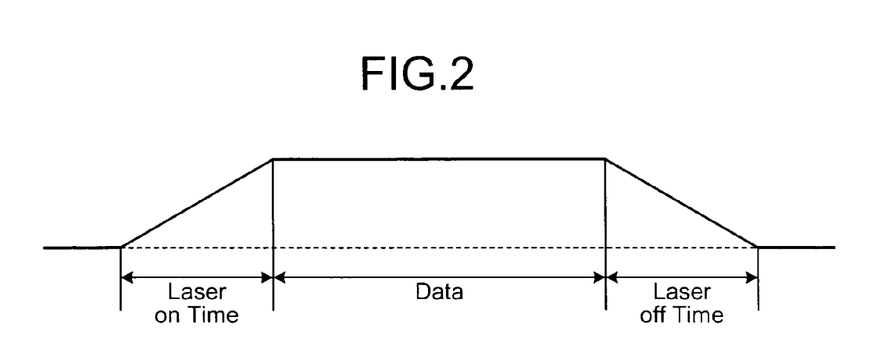
FIG. 2 is an example of a configuration of a burst frame of an optical signal transferred between an OLT and an ONU.
Figure 3:
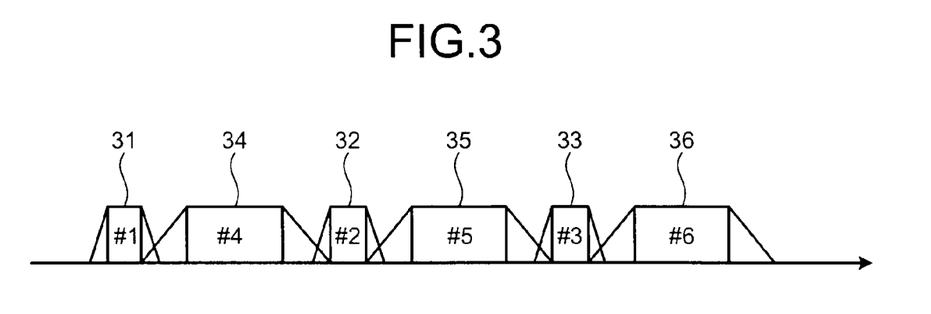
FIG. 3 is a schematic diagram of a transmission state of a burst frame.

FIG. 2 is an example of a configuration of a burst frame of an optical signal transferred between the OLT and the ONU, and FIG. 3 is a schematic diagram of a transmission state of a burst frame. As shown in FIG. 2, there is "Laser On Time" at the head of the burst frame, major "Data" is stored thereafter, and "Laser Off Time" is arranged lastly. In such a burst frame, because "Laser On Time" and "Laser Off Time" are not directly related to the content of the "Data", these respectively become a front overhead and a rear overhead of the burst frame. Accordingly, as shown in FIG. 3, front and back of burst frames 31 to 33 transmitted by the high-rate ONU and burst frames 34 to 36 transmitted by the low-rate ONU can be superimposed timewise. As shown in FIG. 3, further, the overheads of the burst frame are different in the high-rate ONU and the low-rate ONU. That is, in the burst frames 31, 32, and 33 of the high-rate ONU, the overhead is short, and in the burst frames 34, 35, and 36 of the low-rate ONU, the overhead is long.

Figure 4:
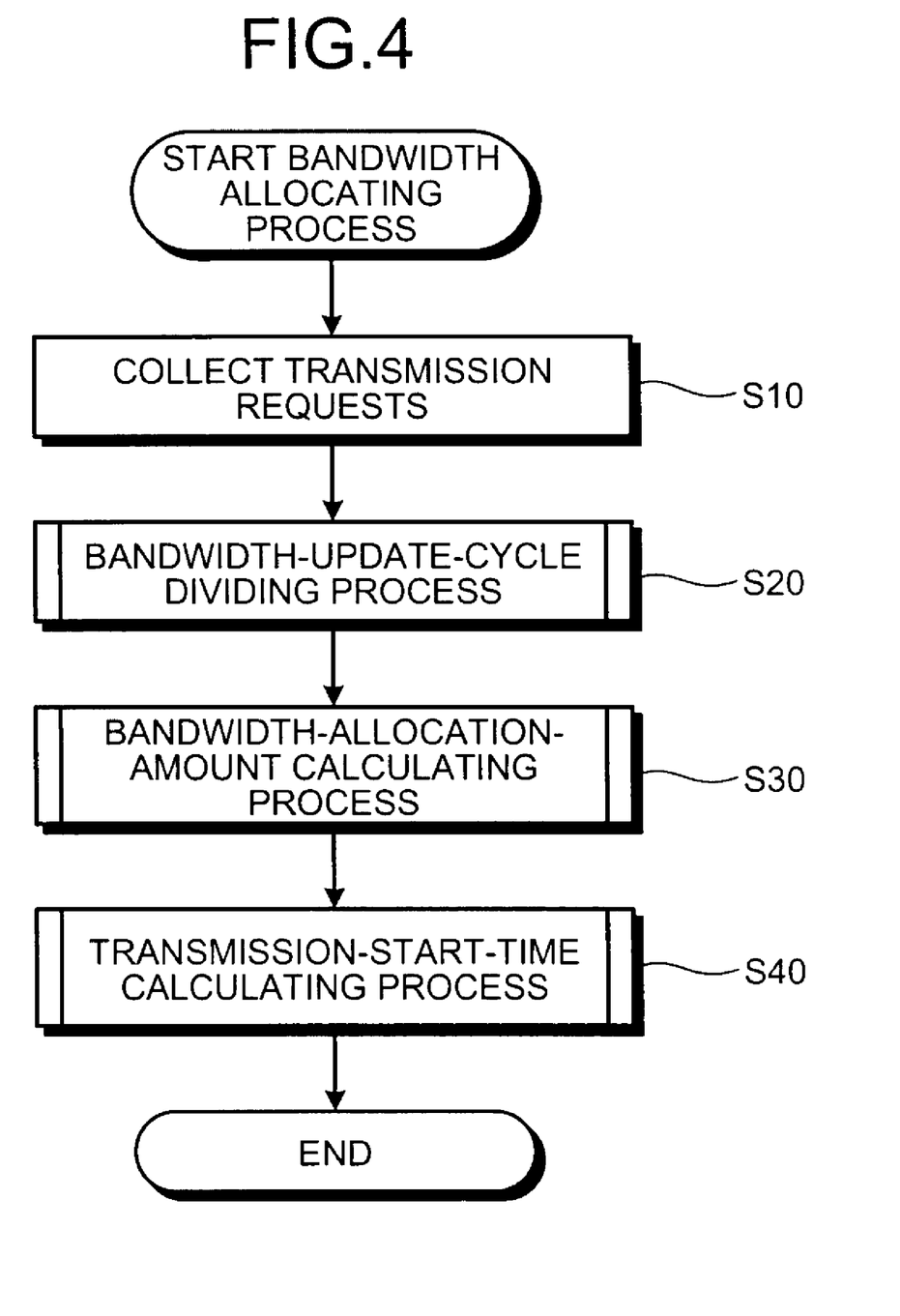
FIG. 4 is a flowchart of an overall outline of a bandwidth allocating process.

A bandwidth allocating process in the OLT 10 according to the present embodiment is explained next. FIG. 4 is a flowchart of an overall outline of the bandwidth allocating process. The bandwidth-request extracting unit 12 of the OLT 10 collects the bandwidth request signals transmitted from the ONUs 20-1 to 20-n (Step S10), and extracts the bandwidth requests of the respective ONUs 20-1 to 20-n. At this time, when a plurality of bandwidth request amounts are stored in a bandwidth request signal by the ONUs 20-1 to 20-n, the bandwidth-request extracting unit 12 handles the sum of the bandwidth request amounts stored in a bandwidth request signal as the bandwidth request amount of the ONUs 20-1 to 20-n.

Figure 5:
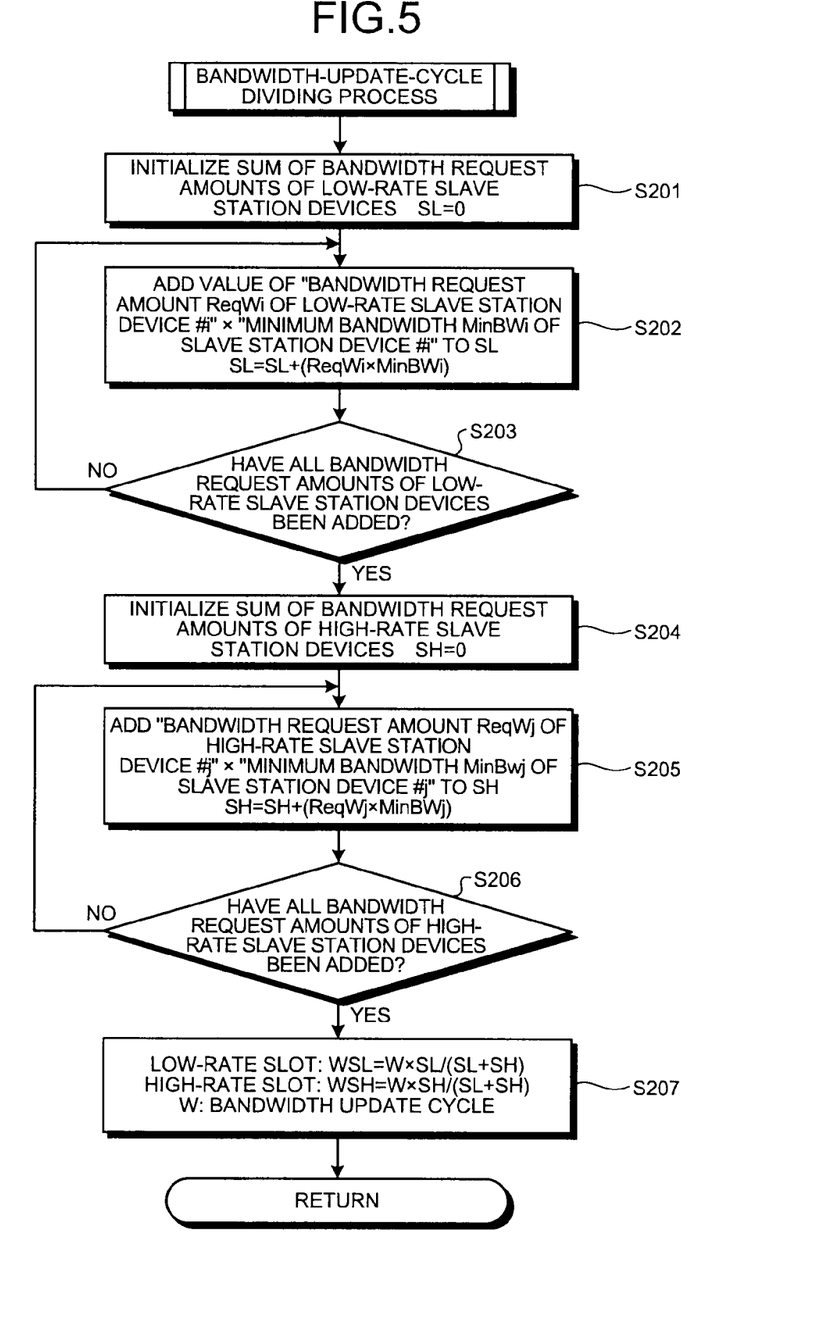
FIG. 5 is a flowchart of details of a dividing process of a bandwidth update cycle.

The bandwidth-update-cycle division processor 13 divides the bandwidth update cycle for each data transfer rate of the ONUs 20-1 to 20-n (Step S20). FIG. 5 is a flowchart of details of a dividing process of the bandwidth update cycle. A case in which a ratio between a sum SL in which the bandwidth request amount of the low-rate ONU is weighted by the minimum bandwidth set to each ONU and a sum SH in which the bandwidth request amount of the high-rate ONU is weighted by the minimum bandwidth set to each ONU is obtained, and a bandwidth update cycle W is divided into a high-rate slot WSH and a low-rate slot WSL according to the ratio is explained here.

The bandwidth-update-cycle division processor 13 initializes the sum SL of the bandwidth request amounts of the low-rate ONUs to zero (Step S201). The bandwidth-update-cycle division processor 13 then weights a bandwidth request amount ReqWi of a low-rate ONU #i (#i is an identifier added to the low-rate ONU) by a minimum bandwidth MinBWi of the low-rate ONU #i, which is set to the OLT 10 beforehand, and adds the thus weighted value to the sum SL of the bandwidth request amounts of the low-rate ONUs as shown in the following equation (1) (Step S202). The minimum bandwidth MinBWi is a value set for each low-rate ONU and is, for example, a value reflecting a difference of communication quality set for each ONU.

$$SL = SL + (ReqWi \times MinBWi) \quad (1)$$

The bandwidth-update-cycle division processor 13 determines whether the bandwidth request amounts of all the low-rate ONUs have been processed (Step S203). When there is an unprocessed bandwidth request amount of the low-rate ONU (NO at Step S203), the process returns to Step S202, and the above process is repeated until the bandwidth request amounts of all the low-rate ONUs are processed.

When the bandwidth request amounts of all the low-rate ONUs have been processed (YES at Step S203), the bandwidth-update-cycle division processor 13 initializes the sum SH of the bandwidth request amounts of the high-rate ONUs to zero (Step S204). The bandwidth-update-cycle division processor 13 weights a bandwidth request amount ReqWj of a high-rate ONU #j (#j is an identifier added to the high-rate ONU) by a minimum bandwidth MinBWj of the high-rate ONU #j, which is set to the OLT 10 beforehand, and adds the thus weighted value to the sum SH of the bandwidth request amounts of the high-rate ONUs as shown in the following equation (2) (Step S205). The minimum bandwidth MinBWj is a value set for each high-rate ONU and is, for example, a value reflecting a difference of the communication quality set for each ONU.

$$SH = SH + (ReqWj \times MinBWj) \quad (2)$$

The bandwidth-update-cycle division processor 13 then determines whether the bandwidth request amounts of all the high-rate ONUs have been processed (Step S206). When there is an unprocessed bandwidth request amount of the high-rate ONU (NO at Step S206), the process returns to Step S205, and the above process is repeated until the bandwidth request amounts of all the high-rate ONUs are processed.

When the bandwidth request amounts of all the high-rate ONUs have been processed (YES at Step S206), the bandwidth-update-cycle division processor 13 calculates a low-rate slot WSL to be allocated to the low-rate ONU and a high-rate slot WSH to be allocated to the high-rate ONU (Step S207). The respective slots are calculated, as shown by equations (3) and (4), by regarding the bandwidth update cycle W as a value proportional to the sum of the bandwidth request amounts of the respective rates.

$$WSL = W \times SL / (SL + SH) \quad (3)$$

$$WSH = W \times SH / (SL + SH) \quad (4)$$

Thus, the bandwidth update cycle is divided into two slots, that is, the low-rate slot WSL to be allocated for the low-rate ONUs and the high-rate slot WSH to be allocated for the high-rate ONUs, thereby finishing the dividing process of the bandwidth update cycle, and the process returns to the process in FIG. 4. In the above explanations, the bandwidth request amount SH of the high-rate ONU is obtained after obtaining the bandwidth request amount SL of the low-rate ONU; however, the order can be reversed.

Figure 6:
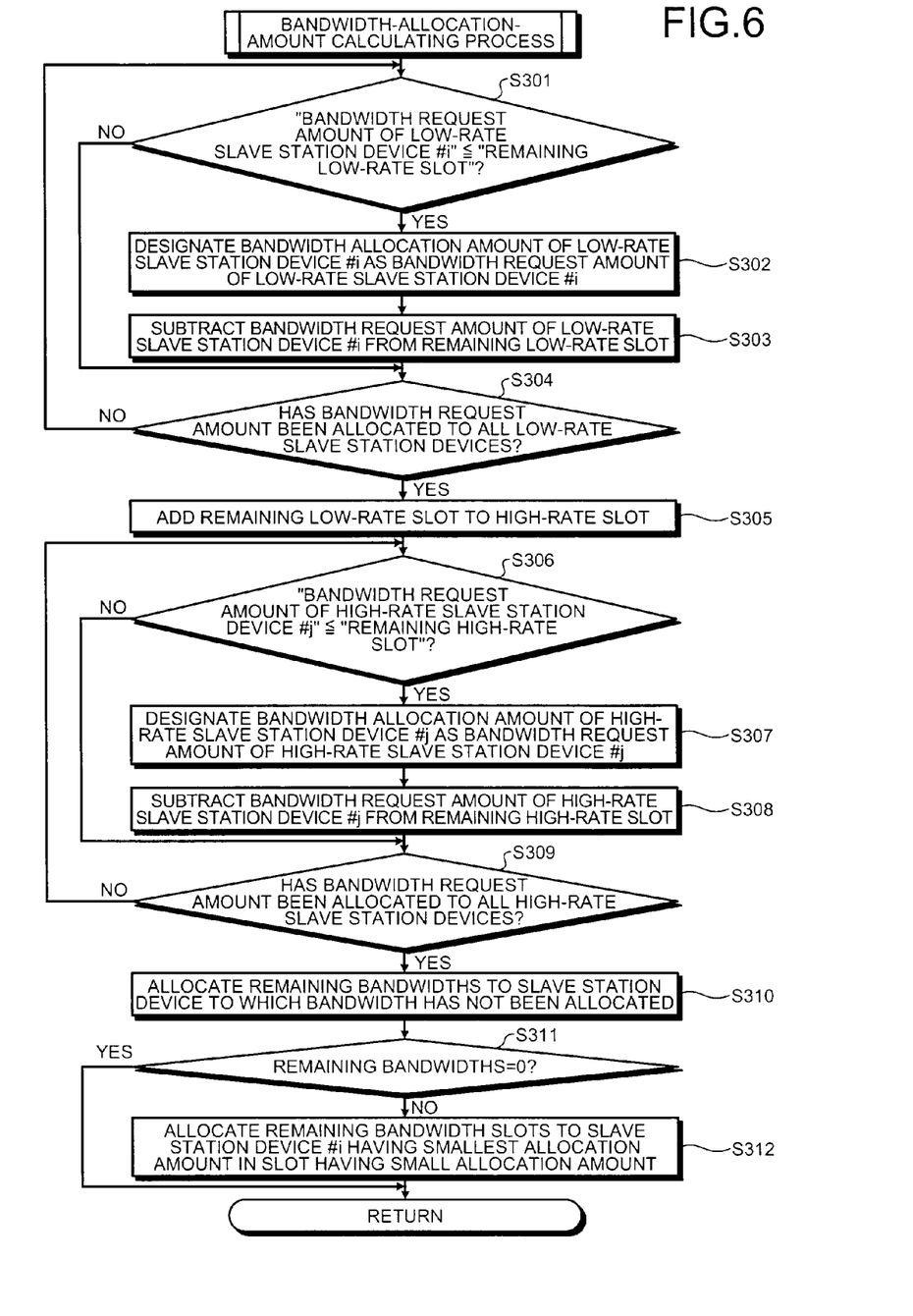
FIG. 6 is a flowchart of details of a process of a bandwidth-allocation-amount calculating process.

The bandwidth-allocation-amount calculating unit 14 calculates a bandwidth allocation amount BAi for each of the ONUS 20-1 to 20-n, based on the high-rate slot WSH and the low-rate slot WSL divided by the dividing process of the bandwidth update cycle, and the bandwidth request amount of the respective ONUS 20-1 to 20-n having the data transfer rate corresponding to the divided bandwidth update cycle (Step S30). FIG. 6 is a flowchart of details of a process of a bandwidth-allocation-amount calculating process.

The bandwidth-allocation-amount calculating unit 14 extracts a low-rate ONU #i from the low-rate ONUS, and determines whether the bandwidth request amount ReqWi of the extracted low-rate ONU #i is equal to or smaller than the low-rate slot WSL (Step S301). When the bandwidth request amount ReqWi of the low-rate ONU #i is equal to or smaller than the low-rate slot WSL (YES at Step S301), as shown in the following equation (5), the bandwidth-allocation-amount calculating unit 14 designates the bandwidth allocation amount BAi of the low-rate ONU #i as the bandwidth request amount ReqWi (Step S302).

$$BAi = ReqWi \quad (5)$$

As shown in the following equation (6), the bandwidth-allocation-amount calculating unit 14 subtracts the allocated bandwidth amount ReqWi from the low-rate slot WSL, to calculate a remainder of the low-rate slot WSL (Step S303). The remaining value of the low-rate slot is designated as a new low-rate slot WSL.

$$WSL = WSL - ReqWi \quad (6)$$

When the bandwidth request amount ReqWi of the low-rate ONU #i is larger than the remaining low-rate slot WSL at Step S301 (NO at Step S301), the bandwidth-allocation-amount calculating unit 14 does not perform the bandwidth allocating process, and handles the low-rate ONU #i as the one for which the bandwidth allocating process has finished. Thereafter or after Step S303, the bandwidth-allocation-amount calculating unit 14 determines whether the allocating process of the bandwidth request amount has finished for all the low-rate ONUs (Step S304). When there is a low-rate ONU for which the allocating process of the bandwidth request amount has not finished (NO at Step S304), the process returns to Step S301, to repeat the process.

When the allocating process of the bandwidth request amount has finished for all the low-rate ONUs (YES at Step S304), as shown in the following equation (7), the bandwidth-allocation-amount calculating unit 14 adds remaining WSL of the low-rate slot to the high-rate slot WSH obtained by the equation (4) (Step S305), and designates the value as a new high-rate slot WSH.

$$WSH = WSH + WSL \quad (7)$$

The bandwidth-allocation-amount calculating unit 14 extracts a high-rate ONU #j from the high-rate ONUs, and determines whether the bandwidth request amount ReqWj of the extracted high-rate ONU #j is equal to or smaller than the high-rate slot WSH (Step S306). When the bandwidth request amount ReqWj of the high-rate ONU #j is equal to or smaller than the high-rate slot WSH (YES at Step S306), as shown in the following equation (8), the bandwidth-allocation-amount calculating unit 14 designates the bandwidth allocation amount BAj of the high-rate ONU #jas the bandwidth request amount ReqWj (Step S307).

$$BAj = ReqWj \quad (8)$$

Next, as shown in an equation (9), the bandwidth-allocation-amount calculating unit 14 subtracts the allocated bandwidth amount ReqWj from the high-rate slot WSH, to calculate a remainder of the high-rate slot WSH (Step S308). The remaining value of the high-rate slot is designated as a new high-rate slot WSH.

$$WSH = WSH - ReqWj \quad (9)$$

When the bandwidth request amount ReqWj of the high-rate ONU #j is larger than the remaining high-rate slot WSH at Step S306 (NO at Step S306), the bandwidth-allocation-amount calculating unit 14 does not perform the bandwidth allocating process, and handles the high-rate ONU #j as the one for which the bandwidth allocating process has finished. Thereafter or after Step S308, the bandwidth-allocation-amount calculating unit 14 determines whether the allocating process of the bandwidth request amount has finished for all the high-rate ONUs (Step S309). When there is a high-rate ONU for which the allocating process of the bandwidth request amount has not finished (NO at Step S309), the process returns to Step S306, to repeat the process.

When the allocating process of the bandwidth request amount has finished for all the high-rate ONUs (YES at Step S309), the bandwidth-allocation-amount calculating unit 14 designates the remaining bandwidths of the high-rate slot WSH as a remaining bandwidth slot to perform the allocating process of the remaining bandwidth slot. Specifically, the bandwidth-allocation-amount calculating unit 14 performs the bandwidth allocating process with respect to the low-rate ONU in which the bandwidth request amount is larger than the remaining low-rate slot WSL and the bandwidth allocating process is not performed at Step S301, and the high-rate ONU in which the bandwidth request amount is larger than the remaining high-rate slot WSH and the bandwidth allocating process is not performed at Step S306 (Step S310). The bandwidth-allocation-amount calculating unit 14 then determines whether there is no remaining bandwidth (Step S311). When there are remaining bandwidths (NO at Step S311), the bandwidth-allocation-amount calculating unit 14 allocates, as shown in an equation (10), remaining bandwidths WSH to ONU #k having the smallest allocation amount in the slot having a small allocation amount (Step S312). When there is no remaining bandwidth at Step S311 (YES at Step S311), the bandwidth-allocation calculating process finishes, and the process returns to the process in FIG. 4. In the above explanations, the allocating process of the bandwidth request amount of the high-rate ONU is performed after the allocating process of the bandwidth request amount of the low-rate ONU, however, the order thereof is not limited thereto, and the order can be reversed.

$$BAk = BAk + WSH \quad (10)$$

Figure 7:
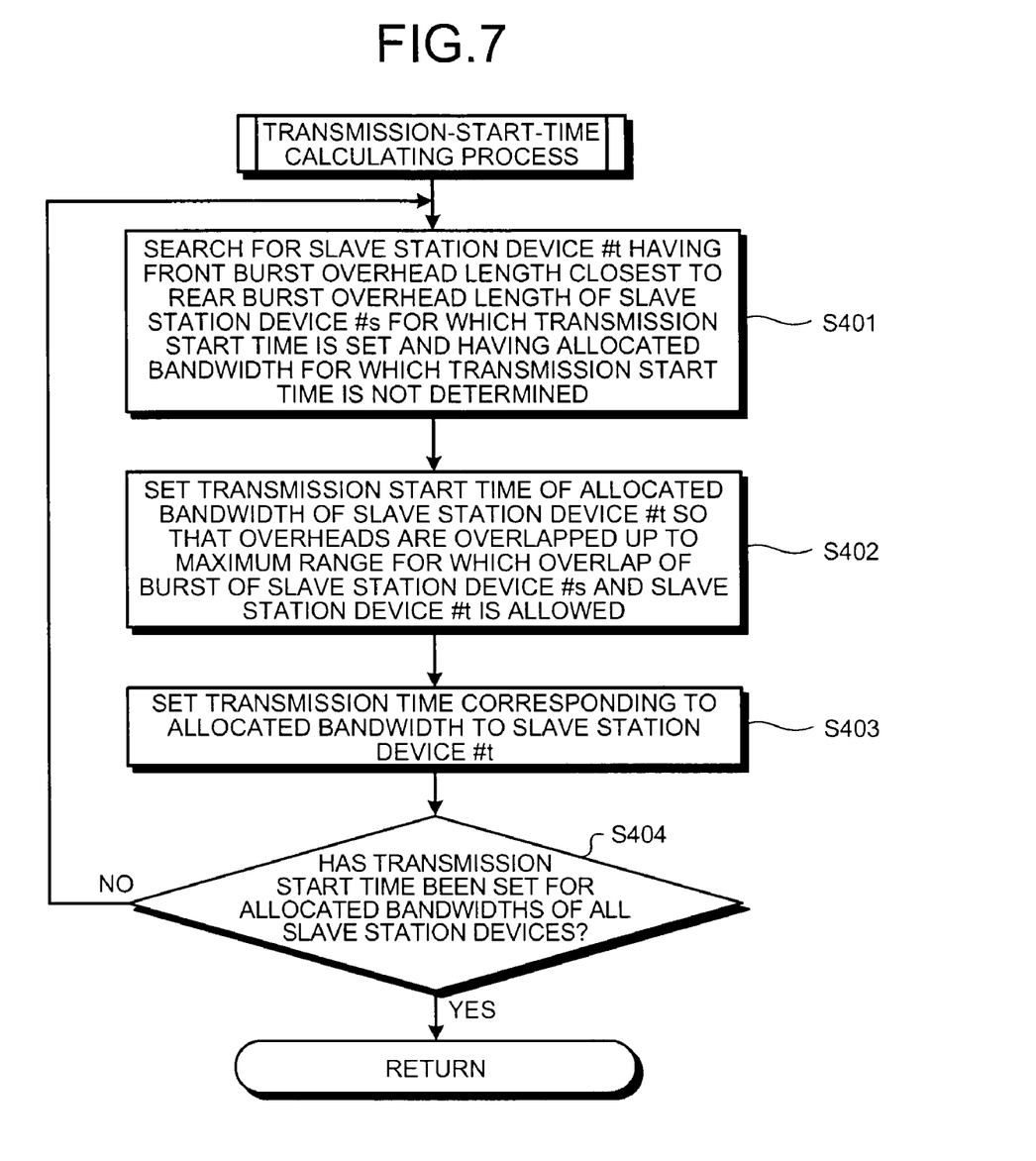
FIG. 7 is a flowchart of an example of a procedure of a transmission-start-time calculating process.

The transmission-start-time calculating unit 15 calculates the transmission start time and the transmission time for the allocated bandwidth (Step S40). FIG. 7 is a flowchart of an example of a procedure of a transmission-start-time calculating process. It is assumed that before performing the calculating process of the transmission start time, the OLT 10 holds the overhead information including the front overhead length and the rear overhead length of the burst frame for each of the ONUs 20-1 to 20-n beforehand. It is assumed that the OLT 10 acquires the overhead information for all the ONUs 20-1 to 20-n connected to the OLT 10 in an initial state, and the OLT 10 has a function of fetching and holding the overhead information of the connected ONUs 20-1 to 20-n when the ONUs 20-1 to 20-n are newly connected to the OLT 10.

The transmission-start-time calculating unit 15 searches for ONU #t having a front overhead length closest to the rear overhead length of ONU #s for which the transmission start time is set last time and having an allocated bandwidth for which the transmission start time is not determined (Step S401). When the transmission start time of the allocated bandwidth, which is the first of the bandwidth update cycle, is calculated, the transmission-start-time calculating unit 15 performs the process by assuming the ONUs 20-1 to 20-n set to the last allocated bandwidth of the previous bandwidth update cycle as ONU #s for which the transmission time is set previously. When there are a plurality of candidates, the transmission-start-time calculating unit 15 selects one candidate from the candidates based on a predetermined criterion, for example, according to a decreasing order of identification number.

The transmission-start-time calculating unit 15 then sets the transmission start time of the allocated bandwidth of ONU #t so that the rear overhead of ONU #s for which the transmission start time is set previously overlaps on the first overhead of the selected ONU #t up to the maximum range for which overlap is allowed (Step S402). The transmission-start-time calculating unit 15 also sets the transmission time corresponding to the allocated bandwidth to the selected ONU #t (Step S403).

Next, the transmission-start-time calculating unit 15 determines whether the transmission start time have been set for all the allocated bandwidths of all the ONUs 20-1 to 20-n connected to the OLT 10 (Step S404). When any one of the ONUs 20-1 to 20-n has the allocated bandwidth for which the transmission start time has not been set (NO at Step S404), the process returns to Step S401 again, to repeat the process until there is no ONUs 20-1 to 20-n having the allocated bandwidth for which the transmission start time has not been set. When there is no ONUs 20-1 to 20-n having the allocated bandwidth for which the transmission start time has not been set (YES at Step S404), the transmission-start-time calculating unit 15 finishes the calculating process of the transmission start time, thereby finishing the bandwidth allocating process performed by the OLT 10.

Figure 8:
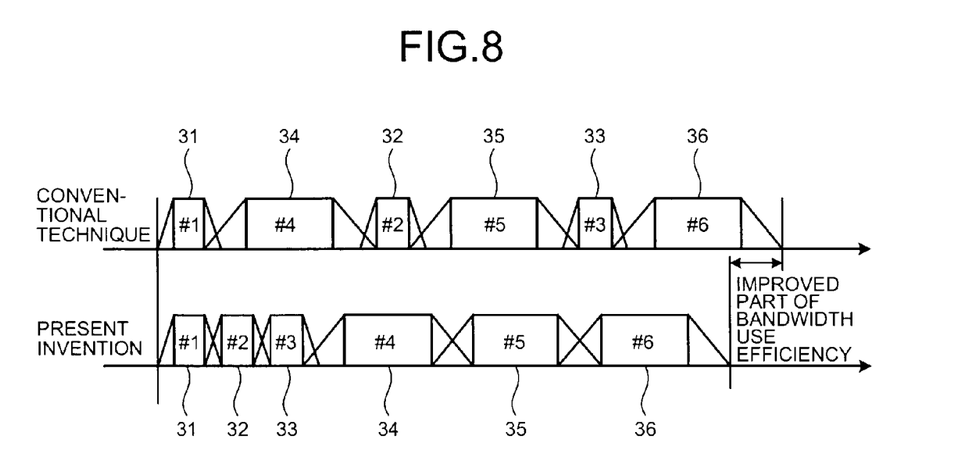
FIG. 8 is a schematic diagram of an arrangement example of a burst frame of an ONU according to the embodiment and that according to a conventional example.

FIG. 8 is a schematic diagram of an arrangement example of a burst frame of the ONU according to the present embodiment and that according to a conventional example. In an arrangement method according to the present embodiment, the burst frames including the overhead of substantially the same length are continuously arranged, as compared with a case of the conventional example in which the burst frames 31, 32 and 33 of low-rate ONUs #1, #2 and #3 and the burst frames 34, 35 and 36 of high-rate ONUs #4, #5 and #6 are alternately arranged. That is, the burst frames 31, 32, and 33 of low-rate ONUs #1, #2 and #3 are continuously arranged and the burst frames 34, 35 and 36 of high-rate ONUS #4, #5 and #6 are continuously arranged. Accordingly, the overheads of the burst frames 31 to 36 can be efficiently offset. As a result, the bandwidth use efficiency can be improved.

In the above explanations, the dividing process of the bandwidth update cycle, the minimum bandwidth MinBW set to the respective ONUs 20-1 to 20-n is used as a numerical value indicating the communication quality at the time of weighting the bandwidth request amount of the respective ONUs 20-1 to 20-n. However, the dividing process of the bandwidth update cycle and other bandwidth allocating processes can be performed by using the maximum bandwidth MaxBW set to the ONUs 20-1 to 20-$n$ as the numerical value indicating the communication quality at the time of weighting the bandwidth request amount of the respective ONUs 20-1 to 20-$n$.

In this case, at the time of performing the bandwidth dividing process, the bandwidth-update-cycle division processor 13 of the OLT 10 obtains a ratio between the sum SL in which the bandwidth request amount of the low-rate ONU is weighted by the maximum bandwidth set to each ONU and the sum SH in which the bandwidth request amount of the high-rate ONU is weighted by the maximum bandwidth set to each ONU, and performs the process for dividing a bandwidth update cycle W into the high rate slot WSH and the low rate slot WSL corresponding to the ratio. The maximum bandwidth amount multiplied to the bandwidth request amount of the respective ONUs 20-1 to 20-$n$ has a role as a coefficient relating to data delay of the ONUs 20-1 to 20-$n$.

At Step S202 in the bandwidth-update-cycle dividing process in FIG. 5, as shown in the following equation (11), the bandwidth request amount ReqWi of the low-rate ONU #i is weighted by using a maximum bandwidth MaxBWi of the low-rate ONU #i set to the OLT 10 beforehand, and the thus weighted bandwidth request amount ReqWi is added to the sum SL of the bandwidth request amounts of the low rate ONUs.

$$SL = SL + (ReqWi \times MaxBWi) \quad (11)$$

At Step S205, as shown in the following equation (12), the bandwidth request amount ReqWj of the high-rate ONU #j is weighted by using a maximum bandwidth MaxBWj of the high-rate ONU #j set to the OLT 10 beforehand, and the thus weighted bandwidth request amount ReqWj is added to the sum SH of the bandwidth request amounts of the high rate ONUs.

$$SH = SH + (ReqWj \times MaxBWj) \quad (12)$$

In this manner, by focusing on the maximum bandwidth set to the ONUs 20-1 to 20-$n$ having different transmission rates, the bandwidth update cycle is divided as a ratio of the sum of the bandwidth request amounts weighted by the maximum bandwidth for each transmission rate, and a bandwidth allocation opportunity is provided for each transmission rate, thereby enabling to equalize the transmission data delay due to the transmission rate, without relying on the type of the bandwidth-request-amount notifying method.

At step S312 in the bandwidth-allocation-amount calculating process in FIG. 6, at the time of performing the allocation process of the remaining bandwidths, the remaining bandwidths are allocated to the ONU having the smallest bandwidth allocation amount in the slot having less allocated bandwidth amount. However, the remaining bandwidths can be evenly distributed to the ONUs allocated with the bandwidths in the slot having the smallest bandwidth allocation amount.

That is, at Step S312 in calculation of the bandwidth allocation amount in FIG. 6, the slot having less remaining bandwidths is calculated, and the remaining bandwidths can be equally distributed to all the ONUs allocated with the bandwidths in the slot.

In this way, the allocation amount of the remaining bandwidths are evenly distributed to the ONUs allocated with the bandwidth in the slot having the smallest bandwidth allocation amount, and the allocated bandwidth in the data transmission opportunity of the ONU is evenly used, thereby enabling to maintain fair data delay among the ONUs in the same slot.

As described above, according to the present embodiment, the sum of the bandwidth request amount weighted by the communication quality is obtained for each transmission rate, focusing on an attribute (minimum bandwidth and maximum bandwidth) relating to the communication quality set to the ONUs 20-1 to 20-$n$ having different transmission rates, and the bandwidth update cycle is divided for each transmission rate as a ratio among these, thereby providing a bandwidth allocation opportunity for each transmission rate. Therefore, the transmission data delay due to the transmission rate can be uniformized, not depending on the type of the bandwidth-request-amount notifying method. Further, the transmission start time of the allocated bandwidth is set such that the overlap amount of the overheads increases, by arranging the burst frames having similar overhead length continuously, focusing on the difference in the overhead length of the burst frame of the ONUs 20-1 to 20-$n$ having different transmission rates. Accordingly, the burst overhead can be efficiently offset and the bandwidth use efficiency can be improved.

INDUSTRIAL APPLICABILITY

As described above, the communication device according to the present invention is useful in a master station device of an access network in which a higher-order network and terminal sides such as homes and companies are connected in a one-to-many relationship.

The invention claimed is:

1. A communication device connected to a plurality of slave station devices having different data transmission rates, which generates a transmission permission signal including a transmission start time and a transmission time of data with respect to each of the plurality of slave station devices in a bandwidth update cycle based on a bandwidth request amount from each of the slave station devices and notifies the slave station devices of the transmission permission signal, the communication device comprising:

a bandwidth-update-cycle dividing unit that divides the bandwidth update cycle into slots for each of the data transmission rates based on the bandwidth request amount from each of the slave station devices and a communication quality set for each of the slave station devices;

a bandwidth-allocation-amount calculating unit that allocates a bandwidth to each of the slave station devices in a slot of the corresponding data transmission rate; and a transmission-start-time setting unit that sets a transmission start time and a transmission time of data of each of the slave station devices, based on an overhead length of a data frame transmitted by each of the slave station devices, by searching for slave station devices that have data frames with similar overhead lengths, such that overheads of the data frames with the similar overhead lengths overlap each other, the similar overhead lengths corresponding to overhead lengths that are respectively closest in value.

2. The communication device according to claim 1, wherein the bandwidth-update-cycle dividing unit weights the bandwidth request amount for each of the slave station devices by using a numerical value relating to a communication quality set for each of the slave station devices, obtains a sum of the bandwidth request amounts weighted for each of the data transmission rates, and divides the bandwidth update cycle according to a ratio of the sum of each of the data transmission rates.

3. The communication device according to claim 2, wherein the numerical value relating to the communication quality is a minimum bandwidth or a maximum bandwidth set for each of the slave station devices.

4. The communication device according to claim 1, wherein the bandwidth-allocation-amount calculating unit allocates a bandwidth to allocable slave station devices in the slot corresponding to the data transmission rate, for each of the data transmission rates, adds remaining bandwidths to other ones of the data transmission rates, for which allocation has not been performed yet, allocates remaining bandwidths after performing an allocating process to all the data transmission rates to slave station devices, to which allocation could not be performed in the allocating process at the respective data transmission rates, and allocates further remaining bandwidths to the slave station devices selected according to a predetermined criterion.

5. The communication device according to claim 4, wherein the bandwidth-allocation-amount calculating unit allocates the remaining bandwidths to a slave station device having the smallest bandwidth allocation amount in the slot of a data transmission rate with the smallest allocation amount.

6. The communication device according to claim 4, wherein the bandwidth-allocation-amount calculating unit evenly allocates the remaining bandwidths to the slave station devices to which a bandwidth in the slot of a data transmission rate with the smallest allocation amount is allocated.

7. The communication device according to claim 1, wherein the transmission-start-time setting unit sets a transmission start time of the burst frame of each of the slave station devices based on front overhead lengths and rear overhead lengths of the burst frames of all of the slave station devices connected to the communication device, so that a sum of the overlap amount of a rear overhead of one burst frame of one slave station device and a front overhead of the next burst frame of another slave station device in the bandwidth update cycle becomes maximum.

8. A bandwidth allocation method in a master station device that generates a transmission permission signal including a transmission start time and a transmission time of data with respect to a plurality of slave station devices in a bandwidth update cycle based on a bandwidth request amount from each of the slave station devices and notifies the slave station devices of the transmission permission signal, in a communication system in which one master station device and a plurality of slave station devices having different data transmission rates are connected, the bandwidth allocation method comprising:
- a bandwidth-update-cycle dividing step of dividing the bandwidth update cycle into slots for each of the data transmission rates based on a communication quality set for each of the slave station devices;
- a bandwidth-allocation-amount calculating step of allocating a bandwidth to each of the slave station devices in a slot of the corresponding data transmission rate; and
- a transmission-start-time setting step of setting a transmission start time and a transmission time of data of each of the slave station devices, based on an overhead length of a data frame transmitted by each of the slave station devices, by searching for slave station devices that have data frames with similar overhead lengths, such that overheads of the data frames with the similar overhead lengths overlap each other, the similar overhead lengths corresponding to overhead lengths that are respectively closest in value.

9. A slave station device connected to a communication device, the communication device controlling upstream data communications at a plurality of data transmission rates from a plurality of slave stations and generating a transmission permission signal including a transmission start time and a transmission time of data in a band update cycle based on a band request amount signal from the slave station device and notifying the slave station device of the transmission permission signal, the slave station device comprising:
- a bandwidth request calculating unit to generate the band request amount signal;
- a reception processor to receive the transmission permission signal from the communication device, the permission signal being generated so that a band to the slave station device is allocated in a slot assigned to a group of slave station devices having a same transmission rate as the slave station device; and
- a data transmission controller to transmit data to the communication device with the band specified by the permission signal, and to offset an overhead of an adjacent band of another slave station device of the group, which has the same transmission rate, in the slot by overlapping an overhead of the band assigned to the slave station device.

10. The communication device according to claim 1, wherein the bandwidth-allocation-amount calculating unit one of
- allocates the bandwidth to each of the slave station devices having a lower data transmission rate first, and then allocates the bandwidth to each of the slave station devices having a higher data transmission rate, and
- allocates the bandwidth to each of the slave station devices having the higher data transmission rate first, and then allocates the bandwidth to each of the slave station devices having the lower data transmission rate.

11. The communication device according to claim 1, wherein
- the plurality of slave station devices are classified into a low-rate classification, which includes slave station devices having a lower data transmission rate, and a high-rate classification, which includes slave station devices having a higher data transmission rate,
- the slave station devices included in either the low-rate classification or the high-rate classification have the data frames with similar overhead lengths, and
- the overhead lengths of the data frames of the slave station devices in the low-rate classification being different from the overhead lengths of the data frames of the slave station devices in the high-rate classification.

* * * * *